US007689586B2

(12) United States Patent
Weber

(10) Patent No.: US 7,689,586 B2
(45) Date of Patent: Mar. 30, 2010

(54) REMOTE STATUS AND CONTROL OF STORAGE DEVICES

(75) Inventor: Bret Weber, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 408 days.

(21) Appl. No.: 11/070,361

(22) Filed: Mar. 2, 2005

(65) Prior Publication Data

US 2006/0200491 A1    Sep. 7, 2006

(51) Int. Cl.
G06F 7/00      (2006.01)
G06F 17/30    (2006.01)

(52) U.S. Cl. .................. 707/103 R; 707/9; 707/10; 707/200; 709/223

(58) Field of Classification Search .................. None
See application file for complete search history.

(56) References Cited

U.S. PATENT DOCUMENTS 6,944,654 B1 * 9/2005 Murphy et al. ............... 709/223
7,269,664 B2 * 9/2007 Hutsch et al. ............... 709/246
7,290,168 B1 * 10/2007 DeKoning ...................... 714/9
2003/0084104 A1 * 5/2003 Salem et al. ................ 709/205

* cited by examiner

Primary Examiner—Jean M Corrielus
Assistant Examiner—Loan T Nguyen
(74) Attorney, Agent, or Firm—Cochran Freund & Young LLC

(57) ABSTRACT

A system and method for remotely monitoring and controlling a data storage system comprising a web server that has an ability to send and receive communications with one or more data storage systems through the storage system's main data communication path or through an alternate path. The web server may include a routine which continuously monitors the status of the storage system as well as a routine which pushes changed data to a client device operating a browser. The system and method may consolidate the status and provide control of many different independent data storage systems simultaneously.

17 Claims, 4 Drawing Sheets

REMOTE STATUS AND CONTROL OF STORAGE DEVICES

BACKGROUND OF THE INVENTION a. Field of the Invention

The present invention pertains generally to monitoring, configuration, and control of data storage systems and specifically to remote control of multiple storage systems on a network.

b. Description of the Background

Networked data storage systems are commonplace in today's computing environments. Data storage systems may range from a single server with a single disk drive to large arrays of disk drives with dedicated controllers. Many installations may have multiple arrays, each having a separate controller. In some systems, multiple servers may share multiple disk drive arrays, each having separate controllers.

In some environments, several data storage systems may be located in different geographical areas. Such an arrangement may be for load balancing, redundancy, or other reasons. In many cases, the full time availability of the data storage systems is a mission critical component of a company's business. Instant and immediate response to problems can be crucial to a company's business and, in some situations such as medical record storage, access to data may be a life or death issue.

It would be therefore advantageous to provide a system and method whereby data storage systems may be efficiently monitored and controlled remotely. It would be further advantageous if such a system were compatible with and interoperable with existing methods of monitoring and control of such data storage systems.

SUMMARY OF THE INVENTION

The present invention provides a system and method for remotely monitoring and controlling a data storage system comprising a web server that has an ability to send and receive communications with one or more data storage systems through the storage system's main data communication path or through an alternate path. The web server may include a routine which continuously monitors the status of the storage systems as well as a routine which pushes changed data to a client device operating a browser. The system and method may consolidate the status and provide control of many different independent data storage systems simultaneously.

An embodiment of the present invention may include a system comprising: at least one data storage system having a communications pathway and adapted to receive commands and communicate status, the at least one data storage system being in communication with a network; a server in communication with the network and comprising: a discovery routine adapted to discover the at least one data storage system and establish communications therewith; a communications engine adapted to transmit and receive communications with the at least one data storage system; a status database adapted to retrieve and store status information from the data storage system; an HTTP server adapted to establish communications with a browser, transmit at least one HTML page comprising at least a portion of the status information; and receive commands from the browser.

Another embodiment of the present invention may include a method comprising: connecting a server to a network; detecting at least one data storage system on the network; establishing communications with the data storage system through a communications pathway; determining status information about the data storage system; storing the status in a database; establishing communications with a browser; creating an HTML page comprising at least a portion of the status stored in the database; transmitting the HTML page to the browser; receiving a command from the browser; and transmitting the command to the at least one data storage system via the communications pathway.

The advantages of the present invention include the ability to remotely monitor and control data storage systems through any of various interfaces and devices. Since the monitor and control information is passed through web pages, no special program needs to be run on a client device for a user to perform all administrative tasks with the storage systems.

DETAILED DESCRIPTION OF THE INVENTION

Figure 1:
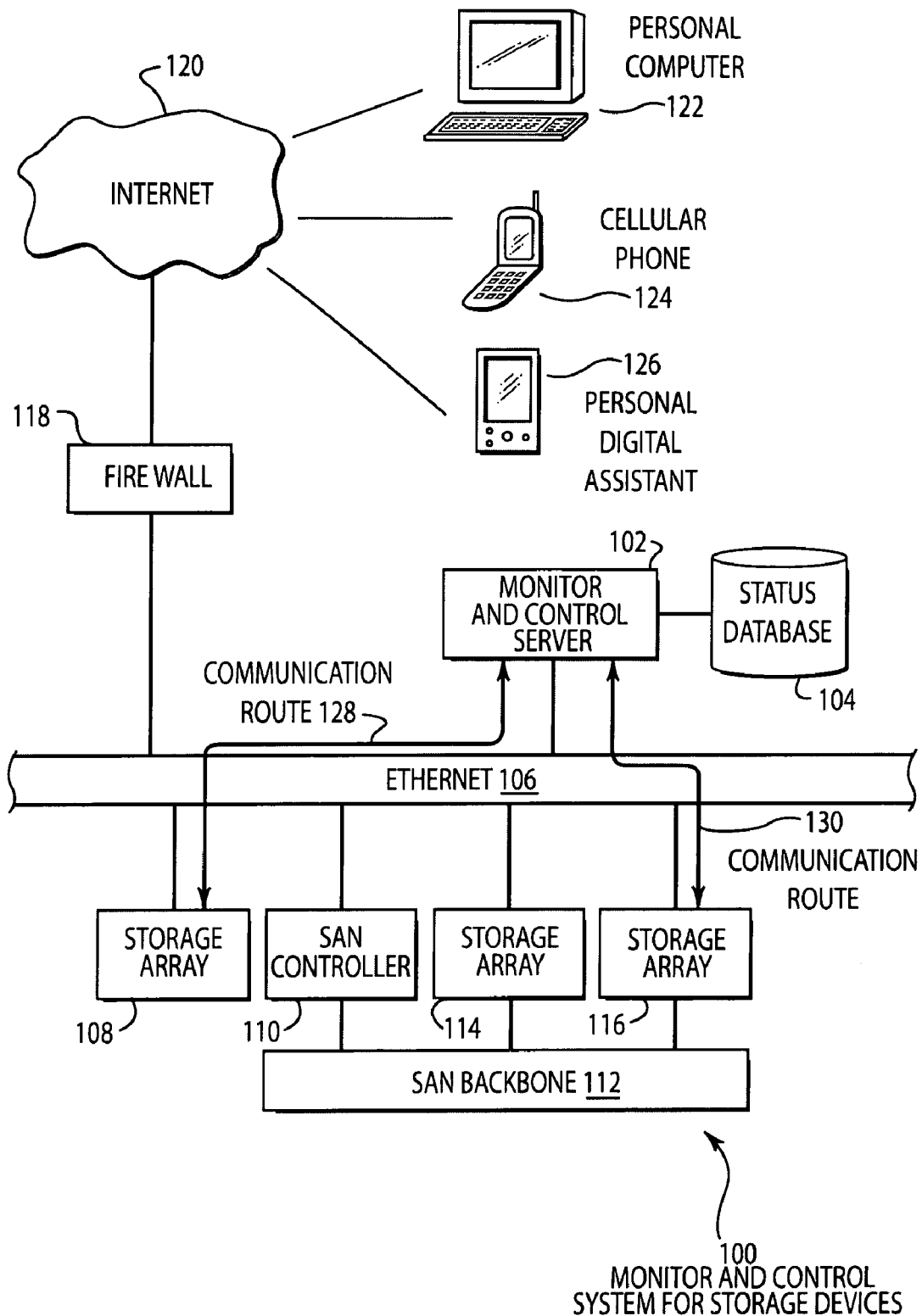
FIG. 1 is a block diagram representation of a monitor and control system for storage devices.

Specific embodiments of the invention are described in detail below. The embodiments were selected to illustrate various features of the invention, but should not be considered to limit the invention to the embodiments described, as the invention is susceptible to various modifications and alternative forms. The invention is to cover all modifications, equivalents, and alternatives falling within the spirit and scope of the invention as defined by the claims. In general, the embodiments were selected to highlight specific inventive aspects or features of the invention.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The invention may be embodied as devices, systems, methods, and/or computer program products. Accordingly, some or all of the invention may be embodied in hardware and/or in software (including firmware, resident software, micro-code, state machines, gate arrays, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the invention is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Throughout this specification, the term "comprising" shall be synonymous with "including," "containing," or "characterized by," is inclusive or open-ended and does not exclude additional, unrecited elements or method steps. "Comprising" is a term of art which means that the named elements are essential, but other elements may be added and still form a construct within the scope of the statement. "Comprising" leaves open for the inclusion of unspecified ingredients even in major amounts.

FIG. 1 is a flowchart illustration of an embodiment 100 showing a system for monitoring and controlling data storage devices. A monitor and control server 102 has an attached status database 104 and is connected to an Ethernet network 106. Also attached to the Ethernet network 106 are a storage array 108 and a SAN controller 110. The SAN (storage area network) controller 110 is connected to a SAN backbone 112 and may control the storage arrays 114 and 116. Through a firewall 118 lies the internet 120 which may be connected to a personal computer 122, a cellular phone 124, or a personal digital assistant 126.

The embodiment 100 is a system whereby the monitor and controller server 102 may monitor and control the storage arrays 108, 114, and 116 by communicating with the various devices connected to the internet. The server 102 may communicate with the various storage arrays and constantly monitor their status. The server may generate and send HTML pages to the devices through the internet, and may also receive commands from those same devices. When a command is received, the server 102 may send the command to the appropriate storage array.

The server 102 has the ability to consolidate information from many different storage arrays. By consolidating the information, the complete status of several storage systems in a company or organization may be viewed and controlled through a single interface. In some configurations, the server may be accessed using a standard multipurpose browser, so that special code need not be downloaded and executed on a client system.

Many different types of data storage devices may be controlled and monitored using embodiment 100. For example, a storage device may be a server that contains one or more disk drives. Other examples include large disk arrays with multiple disk drives in RAID or other configurations, jukeboxes for read only types of media such as DVD or CD, tape backup systems including libraries with tape feeders, or any other data storage device. Such examples are merely representative of the large variety of potential data storage devices useable with embodiment 100 and should not be considered limiting the scope of the present invention.

In many cases, a storage area network ('SAN') may be attached to a network. The SAN may include a controller 110 as well as several other devices, including one or more storage arrays 114 and 116 and other devices such as various backup systems. In some cases, each device attached to the SAN may also be connected to a local area network ('LAN') such as the Ethernet network 106.

In many SAN configurations, multiple controllers and communication paths may be used for redundancy, load balancing, and other functions. Those skilled in the art will appreciate that such configurations are possible with the present invention, even though a single SAN controller 110 and single communication backbone 112 are illustrated.

In a typical SAN operation, the storage arrays 114 and 116 may perform a majority of the storage and retrieval of data over the SAN backbone 112. In many situations, most if not all of the read and write requests would be routed from the Ethernet 106, through the SAN controller 110, and then through the high speed SAN backbone 112 to the appropriate storage array. In some embodiments, the SAN backbone 112 may be a very high speed communications protocol such as Fibre Channel, SCSI, or other high speed protocol.

Some SAN storage arrays may also have a secondary LAN connection through which various secondary communications may occur such as status queries and administrative commands. In such configurations, the monitoring server 102 may use the communications route 130 to query the status and send commands to the storage array 116. For storage devices that are not part of a SAN, such as storage array 108, the server 102 may send and receive communication with the array 108 directly through the Ethernet or LAN 106. In some configurations, SAN storage arrays may not have a secondary connection to a LAN. In such cases, communications between the server 102 and the devices 114 and 116 may have to go through the SAN controller 110 and the SAN backbone 112.

For many devices connected to a SAN, the direct connection to the SAN may be considered the primary data pathway. Alternative connections, such as the connections between a SAN device and the Ethernet 106 may be considered a secondary or alternate data pathway. In such cases, the device may be optimized and prioritized for communicating with the SAN connection more so than the Ethernet connection.

The monitor server 102 may be separated from the internet 120 by a firewall 118. The firewall 118 may be another computer system or device that limits and controls communications between the internet 120 and the local network 106. Such devices may be a combination of hardware and software and may perform any type of blocking, authentication, or security functions.

Various devices, such as the personal computer 122, the cellular phone 124, and the personal digital assistant 126 may be operable to use a standard browser software to operate as a client to the server 102. In many cases, the browser may be a general purpose HTML browser used to browse the World Wide Web. In other cases, the browser may be a custom browser suited for only viewing pages from the server 102.

The personal digital assistant 126 may include any type of computing device, including hand held portable devices such as Pocket PC, Blackberry, Palm, or any other type of interface device.

The client devices 122, 124, and 126 may request status pages from the server 102 and may also send commands for the server 102 to execute. The communication between the client devices 122, 124, and 126 may occur using any type of standard or non-standard communication protocol or network.

The server 102 may be capable of communicating specific commands and interpreting responses from various storage devices. In some cases, the server 102 may be capable of communicating with many different types of storage devices from different manufacturers. Each of the devices may have a separate and distinct format and protocol required to communicate.

The status database 104 may store the current status of each of the storage devices with which the monitor server 102 may interface. The status database 104 may be memory location within a computer system acting as the server 102, such as a portion of RAM or a file stored on disk. In some cases, the historical values of one or more variables of status information may be stored over time.

The mobile devices, such as the cellular phone 124, may enable some or all of the administrative functions of the storage devices to be performed from anywhere. For example, if a crisis occurs while an administrator is at lunch or home for the evening, the administrator may be able to analyze the situation and perform some corrective action through a cellular phone browser or other wireless connection. In another example, a worldwide network for a large corporations may be monitored and administered in one or more central administrative centers located anywhere around the globe.

The location of the storage devices 108, 114, and 116 may be dispersed anywhere so long as the monitor 102 is able to communicate with the device. For example, storage devices on each continent or at each building in a corporate campus could be connected to a network through which the monitoring server 102 may communicate with the device. In some cases, a large network may have several monitoring servers 102 that may be each dedicated to only a local set of storage devices.

The server 102 may have separate monitoring and controlling functions. In the monitoring function, the server 102 may continuously poll the storage devices for status. The server 102 may also send commands to the devices to be executed. Because of the continuous or recurring status polling, several different administrators may use different methods for accessing and controlling one or more devices.

For example, a remote administrator may monitor the status while a local administrator executes a command using the front panel of the storage device or by physically changing the configuration such as by changing out a failed disk drive. Additionally, separate monitoring and/or controlling systems may be used. For example, a certain vendor may have a monitor and control application that executes on a computer system attached to the network or is in direct communication with one or more devices. The server 102 may monitor all of the changes and current status of the devices while they are executing commands sent by the various other communication paths, including additional instances and other users of the server 102.

In some configurations, multiple instances of server 102 may be present in a system. While each instance of server 102 may monitor and control all of the available devices on the network, certain users may be permitted to use one of the instances of server 102 on the network while other users communicate with a different instance of server 102. Because each server 102 sends continually polls the various devices for status, any changes made through one instance of server 102 may be displayed by another instance of server 102. In this manner, multiple controller servers 102 and other controlling mechanisms may be used to monitor and control the various devices in harmony with each other.

Figure 2:
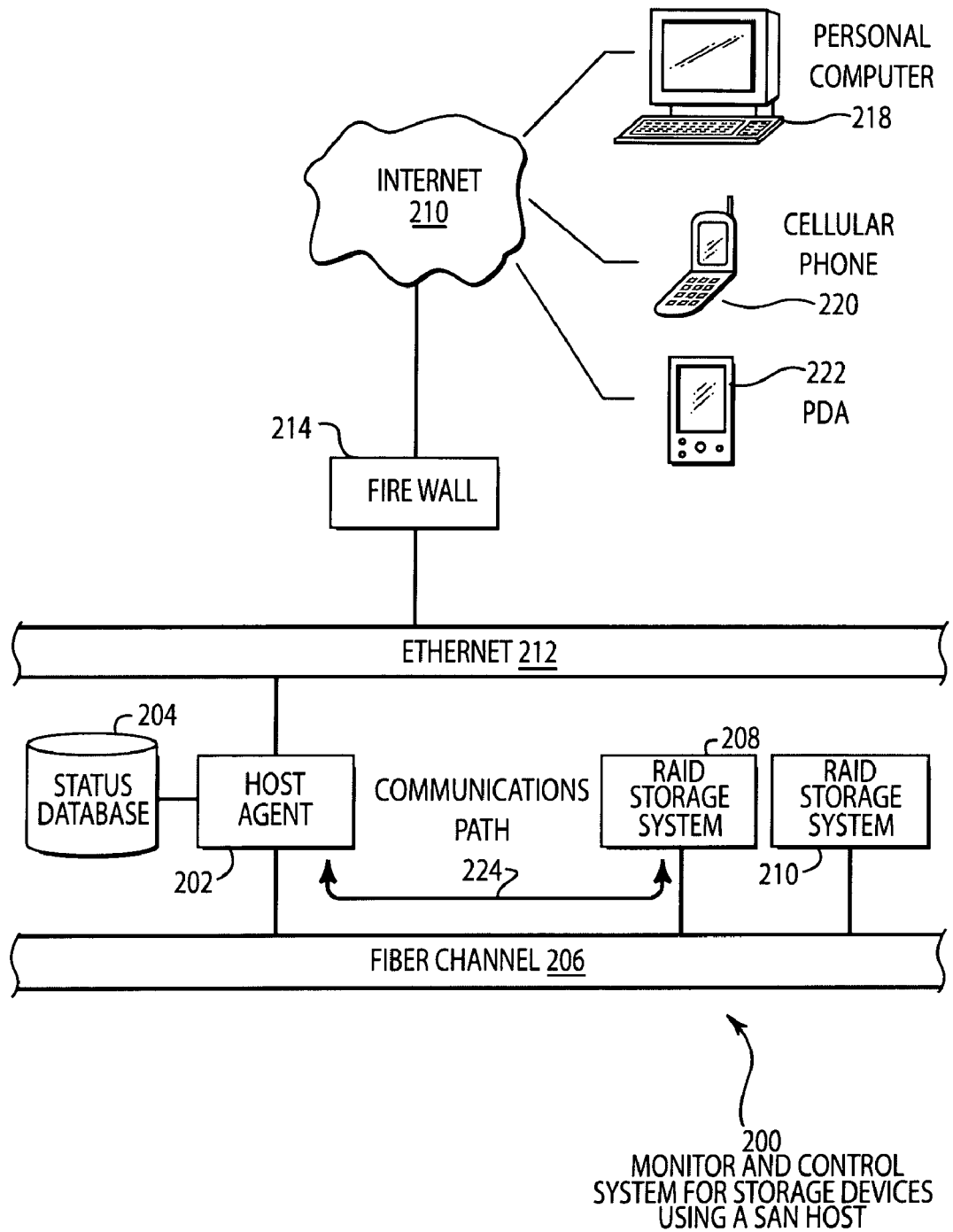
FIG. 2 is a block diagram representation of a monitor and control system for storage devices wherein a SAN controller also performs monitor and control functions.

FIG. 2 illustrates an embodiment 200 showing a monitor and control system for storage devices wherein the SAN controller also functions as the monitor server. The host agent 202 has a status database 204 and connections to a Fibre Channel SAN backbone 206. RAID storage systems 208 and 210 are connected to the Fibre Channel backbone 206. The host 202 also has a connection to the Ethernet 212 which may also serve as a LAN. Through the firewall 214 and the internet 216, various remote clients may communicate, such as a personal computer 218, a cellular phone 220, and a personal digital assistant 222.

Embodiment 200 is similar to embodiment 100 however the host agent 202 performs the dual role of SAN controller as well as the status monitor and controller. In some embodiments, the SAN controller functions may not consume all of the communications and processing bandwidth of such a device so that the device may also perform the monitoring and controlling functions as well.

The host agent 202 may be a software application operating on a SAN controller and capable of determining the status of the various storage systems attached to either the SAN backbone, such as the Fibre Channel link 206, or a LAN or wide area network ('WAN') through the Ethernet network 212. In some embodiments, the host agent 202 may be restricted to communicating with devices through the SAN backbone and not through the LAN or WAN connection, depending on the particular needs of the application.

The host agent 202 may communicate with the various SAN devices through the Fibre Channel backbone 206. In some protocols, a request for a particular device may have a special identifier such as a header that identifies the transmission as a command to be executed by the storage device. When the storage device receives the transmission, it may strip out the command portion and execute the command.

The host agent 202 may perform all of the functions described above for the server 102 of embodiment 100. This includes receiving requests from various client devices for HTML or other browser compatible pages, transmitting the pages to the client device through the firewall 214 and the internet 216.

Figure 3:
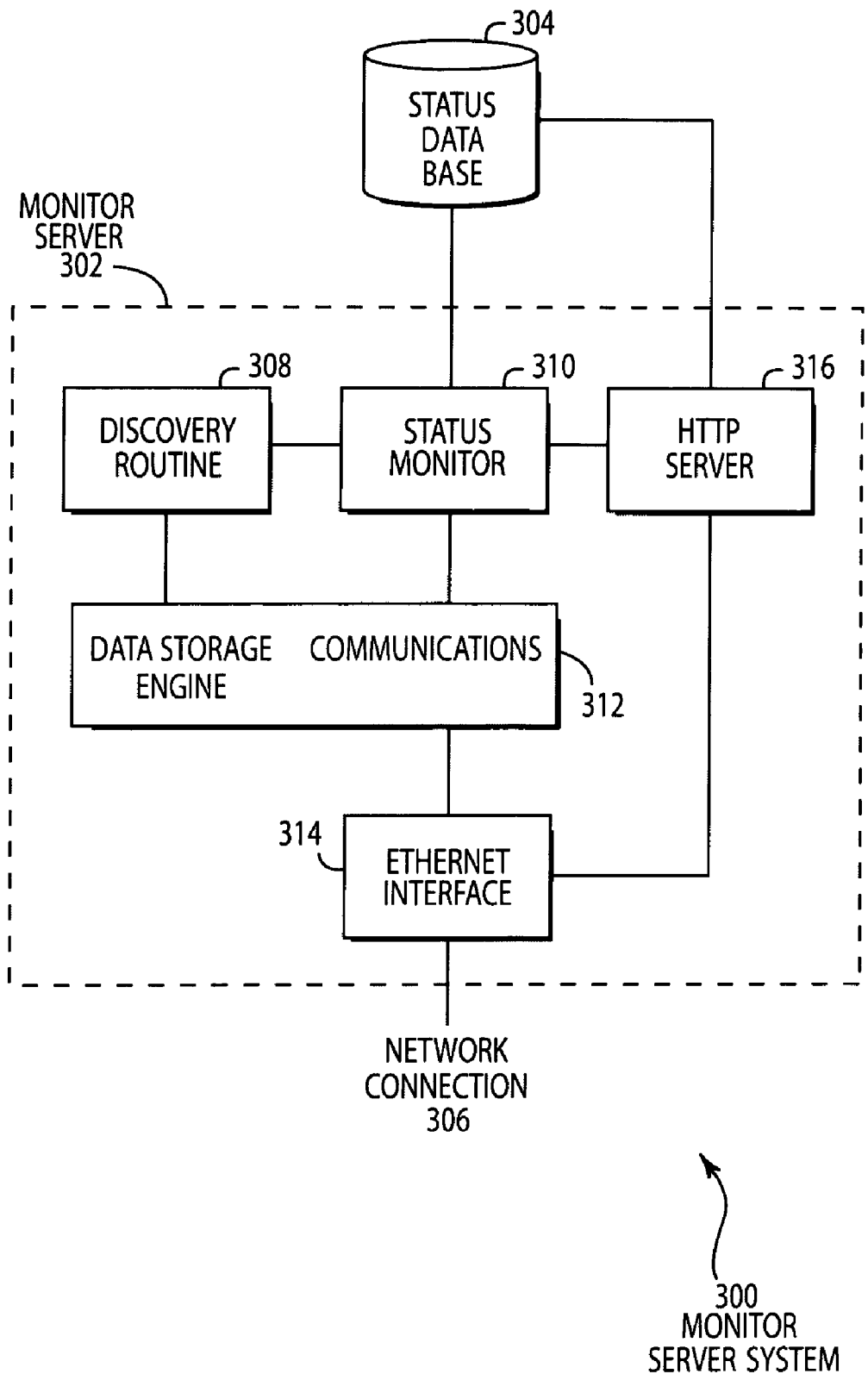
FIG. 3 is a functional representation of a monitor server.

FIG. 3 illustrates embodiment 300 of a monitor server system. The monitor server 302 is connected to a status database 304 and has a network connection 306. Within the monitor server 302 is a discovery routine 308 and a status monitor 310 that communicate through a data storage communications engine 312 to the Ethernet interface 314. The HTTP server 316 is in communication with the status database 304, the status monitor 310, as well as the Ethernet interface 314.

The embodiment 300 is but one way of separating the various functions of the server 302. Different applications may have different architectures depending on the precise functionality required, the various tools and preexisting routines that might be incorporated into the design, and the various judgments and preferences of someone skilled in the art.

The discovery routine 308 may search a network to find all of the storage devices that may be monitored. In some cases, the discovery routine 308 may discover a storage device, initiate communication with the device, and discover its basic properties. The discovery routine 308 may then determine if the device is appropriate for monitor and control.

In establishing a storage device for monitoring and control, the discovery routine 308 may determine if the device should be monitored and controlled by the server 302. In some cases, a user may be queried through the HTTP server to determine whether or not the particular device is to be included. In other cases, the device may be automatically included and the user may later be able to remove the device from monitoring.

The discovery routine 308 may be operated during an initialization and startup sequence, or may be operable continuously or on a recurring basis to detect any new storage device that may be connected to the network. Various monitoring and detection techniques may be used by the discovery routine 308 to uncover and establish communication with a storage device.

In some configurations, a storage device may initiate contact with the server 302 while in other configurations the discovery routine 308 may search the network for candidate devices. In still other configurations, both methods may be used.

The data storage communications engine 312 may perform all the proper details of communicating with the storage devices. For example, the data storage communications engine 312 may encapsulate a request or command in a special message header and type that will be properly interpreted by the device. In another example, the command may be embedded in a standard read or write command but be capable of being intercepted by the device. In some cases, the data storage communications engine 312 may perform only message format preparation and interpretation functions, while in other cases the engine may also provide timing and sequencing functions for message traffic.

The data storage communication engine 312 may be capable of communicating with a host of different data storage devices, each through a different protocol and communication formats.

The status monitor 310 may periodically request status information from the various storage devices and process the responses as required. Any type of status information may be requested and processed, based on the specific application and needs of the various users. For example, some status requests may include the configuration of the hardware. This may include the physical location and logical location of each disk drive in a RAID array, including the status as operational, standby, failed, unknown, or other such status. Additionally, the operational status of power supplies, fans, uninterruptible power supplies, and other support equipment may be requested. Some status requests may relate to operational statistics, such as data throughput, amount of free space, current temperature, read/write requests, current users, and other operational statistics.

In some cases, certain parameters may be requested at a certain frequency while others are not. As but one example, the physical and logical location of disk drives may be checked at a much longer interval than data throughput.

In some instances, the data storage device may signal that changes have recently occurred and that a more thorough status is appropriate. For example, if service is performed to a disk array by replacing a faulty disk drive with a new one, the device may set a flag that service has been performed so that the status monitor 310 may request a filly detailed status.

The status monitor 310 may compare any incoming status reports with the data from the status database 304 to determine if any changes have occurred. In some instances, the status monitor 310 may cause an alert which may signal the HTTP server 316 to send an updated HTML page to a client. In one example, if the status monitor 310 received a status message showing that a disk drive failed in a RAID system, the status monitor 310 may compare the message to the previous status stored in the status data base 304 to determine that the disk drive had failed since the last status. Having this information, the status monitor 310 may send an alert to the HTTP server 316 which may send an alert to a client system. In some cases, the status monitor 310 may send an email or other type of message to a designated user in certain circumstances.

The HTTP server 316 may be capable of establishing a connection with a client browser and communicating with the browser. The HTTP server 316 may be capable of determining the type of browser and selecting an appropriate HTML or other type of page to display on the browser.

In some cases, the various client browsers may have certain information displayed on one browser but not with another. For example, a large, detailed graphical display showing many data points may be sent to a personal computer while a much less detailed display may be sent to a cellular phone browser.

The HTTP server 316 may be capable of authenticating and confirming a user's access to the server. Various authentication and security measures may be taken, including hardware authentication which may allow access to certain MAC addresses or to systems having some identifying hardware tag. Other methods may include password protection, fingerprint reader authentication, or any other security measure appropriate for the situation.

The status monitor 310 may operate continuously and thereby allow other users using the server 302 or other users using different controlling methods to also have monitoring and controlling access to the various devices. For example, several users may be able to monitor the status of the devices. If one user should cause a command to be executed, the effects of the command may be seen when the status monitor 310 polls the device. The user may control a device through any mechanism, including executing front panel commands or switches on the hardware itself, by communicating with the device through a different monitoring and controlling system, or any other method.

Figure 4:
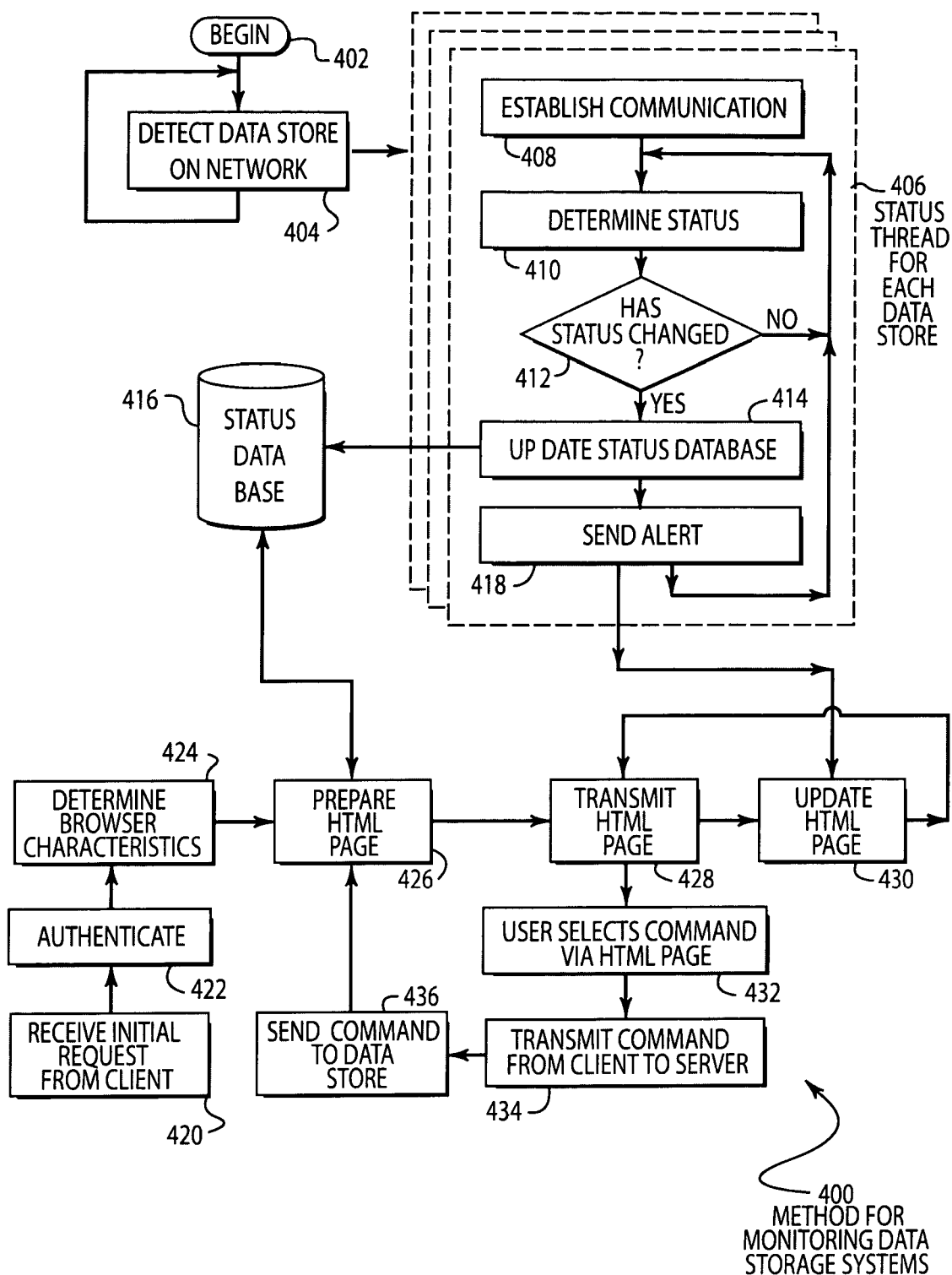
FIG. 4 is a flowchart illustration of a method for monitoring and controlling multiple storage devices.

FIG. 4 illustrates an embodiment 400 of a method for monitoring data storage systems. The process begins in block 402. Data stores are detected on the network in block 404. When a data store is detected, a separate status thread is started for each data store in block 406. The detection of data stores in block 404 may happen continuously or on an ongoing recurring basis. Within the thread 406, communications are established in block 408 and the status is determined in block 410. If the status has changed in block 412, the status is updated in the database in block 414. Further, an alert is sent in block 418. If no changes have been made to the status in block 412, the status is polled again in block 410.

An initial request is received from a client in block 420 and the user is authenticated in block 422. The browser characteristics are determined in block 424 and an HTML page is prepared in block 426 with the aid of the status database 416. The HTML page is transmitted in block 428. If an alert is received from block 418, the HTML page may be updated in block 430 and retransmitted in page 428. The user may select a command via the HTML page in block 432 which is transmitted from the client to the server in block 434 where the command is sent to the data store in block 436.

The embodiment 400 is a step by step process of several parts of a system to manage and monitor data storage systems.

The detection of new data stores in block 404 may be a routine that independently searches out and finds new data stores. The various status threads 406 may also be separately and independently operable. Further, the sequence from blocks 420 through 436 may be yet another separate and independent application. In some configurations, these separate and independent functions may be combined into a single application, while in other configurations separate processors or computers may be employed to perform each separate function.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system comprising:
    at least one data storage system having a communication pathway and adapted to receive commands, communicate status, and signal changes, said at least one data storage system being in communication with a network;
    a server in communication with said network and comprising:
        a discovery routine adapted to discover said at least one data storage system and establish communication with said at least one data storage system;
        a communications engine adapted to transmit and receive communications with said at least one data storage system;
        a status database adapted to retrieve and store status information from said data storage system;
        an HTTP server adapted to establish communication with a browser, transmit at least one HTML page comprising at least a portion of said status information, and receive commands from said browser; and
        a status monitor adapted to determine if a change has occurred to said status information, and in response to a change to said status information, signal said HTTP server to transmit at least one updated HTML page;
        wherein said HTTP server is further adapted to: determine a client type for said client; and transmit at least one HTML page that is configured to displays on said client, based on said client type.

2. The system of claim 1 wherein said HTTP server is further adapted to authenticate a user.

3. The system of claim 1 wherein said communication pathway is a primary data pathway.

4. The system of claim 1 wherein said communication pathway is a secondary communication pathway.

5. The system of claim 1 wherein said client type is a computer terminal.

6. The system of claim 1 wherein said client type is a cellular phone.

7. The system of claim 1 wherein said client type is a personal digital assistant.

8. The system of claim 1 wherein said HTTP server is further adapted to communicate through a firewall.

9. A method comprising:
    connecting a server to a network detecting at least one data storage system on said network;
    establishing communication with said data storage system through a communication pathway;
    determining status information about said data storage system;
    storing said status in a database;
    establishing communication with a browser;
    creating an HTML page comprising at least a portion of said status stored in said database;
    transmitting said HTML page to said browser; receiving a command from said browser;
    transmitting said command to said at least one data storage system via said communication pathway;
    receiving updated status information about said data storage system;
    determining that changes have occurred to said status information; and
    in response to determining that changes have occurred to said status information, transmitting an updated HTML page to said browser;
    determining a client type for said client; and
    transmitting at least one HTML page that is configured to displays on said client, based on said client type.

10. The method of claim 9 further comprising authenticating said browser.

11. The method of claim 9 wherein said communication pathway is a primary data pathway.

12. The method of claim 9 wherein said communication pathway is a secondary communication pathway.

13. The method of claim 9 wherein said client type is a computer terminal.

14. The method of claim 9 wherein said client type is a cellular phone.

15. The method of claim 9 wherein said client type is a personal digital assistant.

16. The method of claim 9 wherein said communication occurs through a firewall.

17. A computer readable storage medium having computer executable instructions embodied therein, said computer program instructions when executed by a processor cause computer for performing the method comprising:
    connecting a server to a network detecting at least one data storage system on said network;
    establishing communication with said data storage system through a communication pathway;
    determining status information about said data storage system;
    storing said status in a database;
    establishing communication with a browser;
    creating an HTML page comprising at least a portion of said status stored in said database;
    transmitting said HTML page to said browser;
    receiving a command from said browser;
    transmitting said command to said at least one data storage system via said communication pathway;
    receiving updated status information about said data storage system;
    determining that changes have occurred to said status information;
    in response to determining that changes have occurred to said status information, transmitting an updated HTML page to said browser;
    wherein said server is further adapted to determine a client type for said client; and
    transmit at least one HTML page that is configured to displays on said client, based on said client type.

* * * * *